(12) United States Patent
Chen

(10) Patent No.: US 8,505,945 B2
(45) Date of Patent: Aug. 13, 2013

(54) THREE-WHEELED SCOOTER DEVICE

(76) Inventor: Shane Chen, Camas, WA (US)

( * ) Notice: Subject to any disclaimer, the term of this patent is extended or adjusted under 35 U.S.C. 154(b) by 0 days.

(21) Appl. No.: 13/411,512

(22) Filed: Mar. 2, 2012

(65) Prior Publication Data

US 2012/0223502 A1 Sep. 6, 2012

Related U.S. Application Data

(60) Provisional application No. 61/448,601, filed on Mar. 2, 2011.

(51) Int. Cl.
*B62M 1/00* (2010.01)
(52) U.S. Cl.
USPC .................... 280/220; 280/47.11; 280/87.041; 280/221; 280/278; 280/287
(58) Field of Classification Search
USPC .............. 280/47.11, 62, 87.043, 87.041, 220, 280/221, 282, 278, 287
See application file for complete search history.

(56) References Cited

U.S. PATENT DOCUMENTS

| | | | | |
|---|---|---|---|---|
| 4,047,732 A | * | 9/1977 | Williams et al. | 280/287 |
| 4,050,712 A | * | 9/1977 | Denzer et al. | 280/278 |
| 4,065,146 A | * | 12/1977 | Denzer | 280/278 |
| 4,087,104 A | * | 5/1978 | Winchell et al. | 280/210 |
| 4,133,551 A | * | 1/1979 | Biskup | 280/221 |
| 4,165,093 A | * | 8/1979 | Biskup | 280/220 |
| 4,540,192 A | * | 9/1985 | Shelton | 280/282 |
| 5,039,121 A | * | 8/1991 | Holter | 280/220 |
| 6,220,612 B1 | * | 4/2001 | Beleski, Jr. | 280/87.041 |
| 6,467,781 B1 | * | 10/2002 | Feng | 280/87.01 |
| 6,485,039 B1 | * | 11/2002 | Ming-Fu | 280/87.041 |
| 6,554,302 B1 | * | 4/2003 | Liu | 280/87.041 |
| 6,851,694 B2 | * | 2/2005 | Feng | 280/220 |
| 6,908,091 B2 | * | 6/2005 | Chuang | 280/87.041 |
| 6,923,459 B2 | * | 8/2005 | Yeo et al. | 280/87.041 |
| 6,976,687 B2 | * | 12/2005 | Beleski, Jr. | 280/87.041 |
| 6,991,242 B2 | * | 1/2006 | Teng et al. | 280/87.041 |
| 7,377,528 B1 | * | 5/2008 | Xie | 280/87.041 |
| 7,549,655 B2 | * | 6/2009 | Fan | 280/87.041 |
| 7,597,334 B2 | * | 10/2009 | Chen | 280/87.041 |
| 7,926,825 B2 | * | 4/2011 | Chen | 280/87.043 |
| 2010/0234186 A1 | * | 9/2010 | Fan | 482/51 |
| 2011/0298193 A1 | * | 12/2011 | Fan | 280/221 |

* cited by examiner

*Primary Examiner* — Kevin Hurley
*Assistant Examiner* — Marc A Scharich

(57) ABSTRACT

A human-powered scooter propelled by side-to-side movement of the user. The scooter has a steering mechanism coupled to a front wheel, and two frame arms pivotably coupled to the steering mechanism and extending rearward, to which two rear wheels are respectively coupled. A novel linking piece such as a mechanical plate member coupled to the steering mechanism can releasable engage with the frame arms in order to restrict their pivoting to equal magnitude in opposite directions. The linking piece can also disengage from the frame arms to allow the frame arms to be folded up. The pivoting axes of the two frame arms are predetermined such that, when folded, the frame arms are as near as possible to being parallel to a main steering control shaft of the steering mechanism. A mechanism for directly braking at least one of the rear wheels is also disclosed.

18 Claims, 10 Drawing Sheets

Detail A

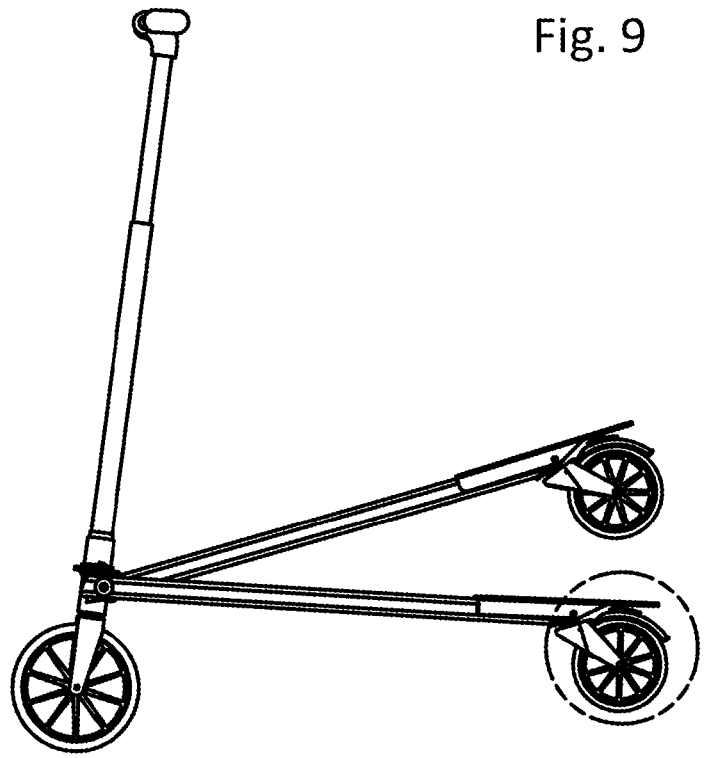
Fig. 9
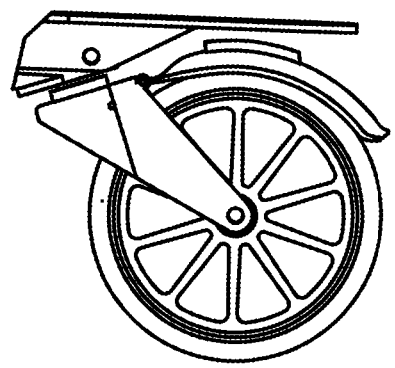

THREE-WHEELED SCOOTER DEVICE

CROSS-REFERENCE TO RELATED APPLICATIONS

This application claims the benefit of provisional patent application No. 61/448,601 filed on 2011 Mar. 2 by the present inventor.

FIELD OF THE INVENTION

The present invention relates to human-powered scooter devices having three wheels and designed for being propelled by side-to-side movement. In particular it relates to linking mechanisms for the frame arms supporting the rear wheels, and also to braking mechanisms for the rear wheels.

BRIEF DESCRIPTION OF THE FIGURES

FIG. 9 shows a side view of another embodiment of a scooter device in accordance with the present invention, with an inset showing one of the rear wheels.

DETAILED DESCRIPTION

Figure 1:
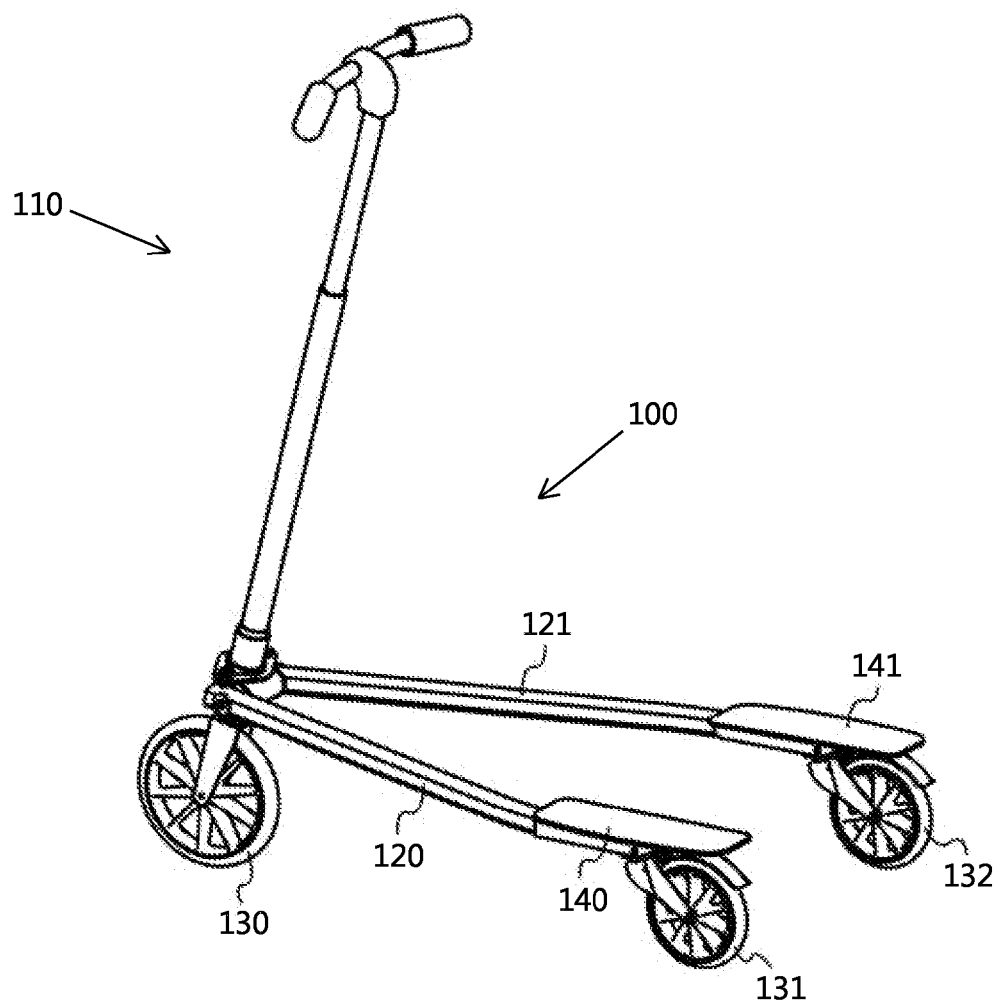
FIG. 1 shows a perspective view of a scooter device in accordance with the present invention.

Referring to FIG. 1, a perspective view of a scooter device in accordance with the present invention is shown. The scooter device has a frame 100 which includes a steering mechanism 110, two frame arms 120 and 121, a front wheel 130 and two rear wheels 131 and 132 each associated with a respective frame arm. Frame arms 120 and 121 are pivotably coupled to steering mechanism 110 and extend diagonally rearward. The pivoting axes of frame arms 120 and 121 are both angled forward, such that the forward-facing angle between the two axes is less than 180 degrees. The user stands upon foot pedals 140 and 141 which are coupled to frame arms 120 and 121, and may propel the scooter by a side-to-side movement of his legs. During the propelling movement, frame arms 120 and 121 can pivot alternatingly in opposite directions while steering mechanism 111 tilts alternatingly to the left and right.

Figure 2:
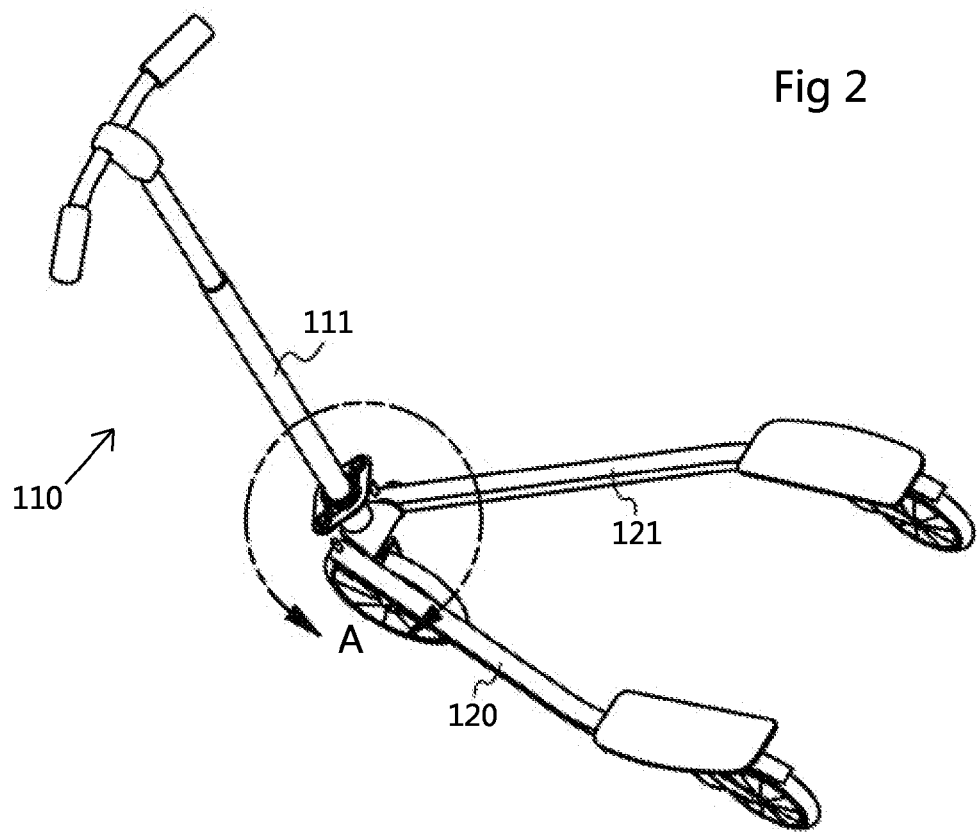
FIG. 2 shows another perspective view of the scooter device of FIG. 1. Detail A shows the area around the front wheel.
Figure 2:
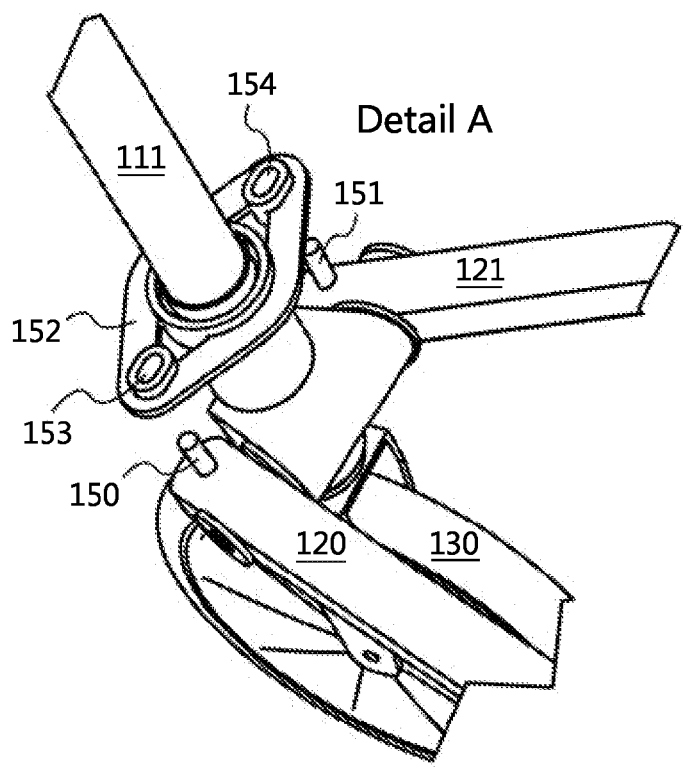

Referring to FIG. 2, another perspective view of the scooter device of FIG. 1 is shown, along with an inset (Detail A) which shows the base of steering mechanism 110 and the forward portions of frame arms 120 and 121 in detail. In this embodiment, each of frame arms 120 and 121 has a rigidly affixed linking member 150 and 151 protruding generally upward. A linking piece 152, attached to shaft 111 and slidable thereon, is provided with holes 153 and 154 for receiving linking members 150 and 151. Linking piece 152 has an engaged position for normal use, in which linking members 150 and 151 are fitted into holes 153 and 154; and a disengaged position for folding, in which linking piece 152 has been slid upward along shaft 111 such that linking piece 152 does not come in contact with linking members 150 and 151. When the scooter is leaning to the right, as in FIG. 3, left frame arm 120 is displaced downward and right frame arm 121 is displaced upward. Downward displacement of left frame arm 120 corresponds to linking member 150 being pivoted toward the rear. Upward displacement of right frame arm 121 corresponds to linking member 151 pivoting toward the front. Linking piece 152 is engaged with linking members 150 and 151 and, since linking members 150 and 151 are locked into holes 153 and 154, linking piece 152 is turned to the right. The engagement of linking piece 152 with linking members 150 and 151 restricts frame arms 120 and 121 to displacement of equal magnitude in opposite directions, which keeps the structure of frame arms 120 and 121 and steering mechanism 110 stable during the side-to-side propelling movement.

Figure 3:
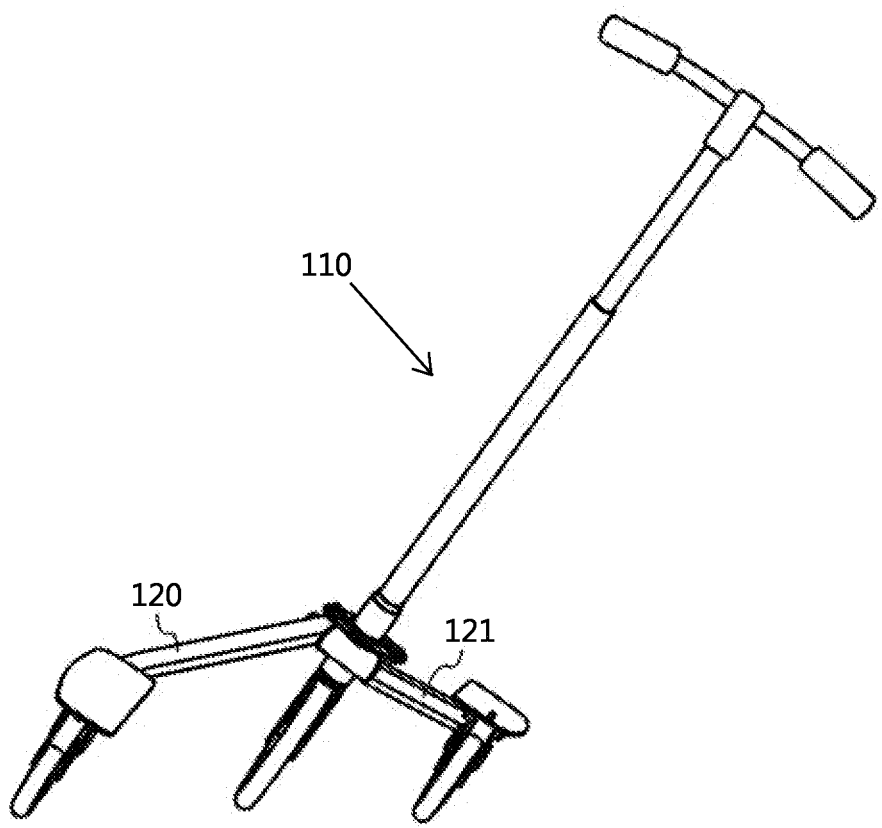
FIG. 3 shows a rear elevational view of the scooter device of FIG. 1, wherein the scooter is leaning to the right.
Figure 4:
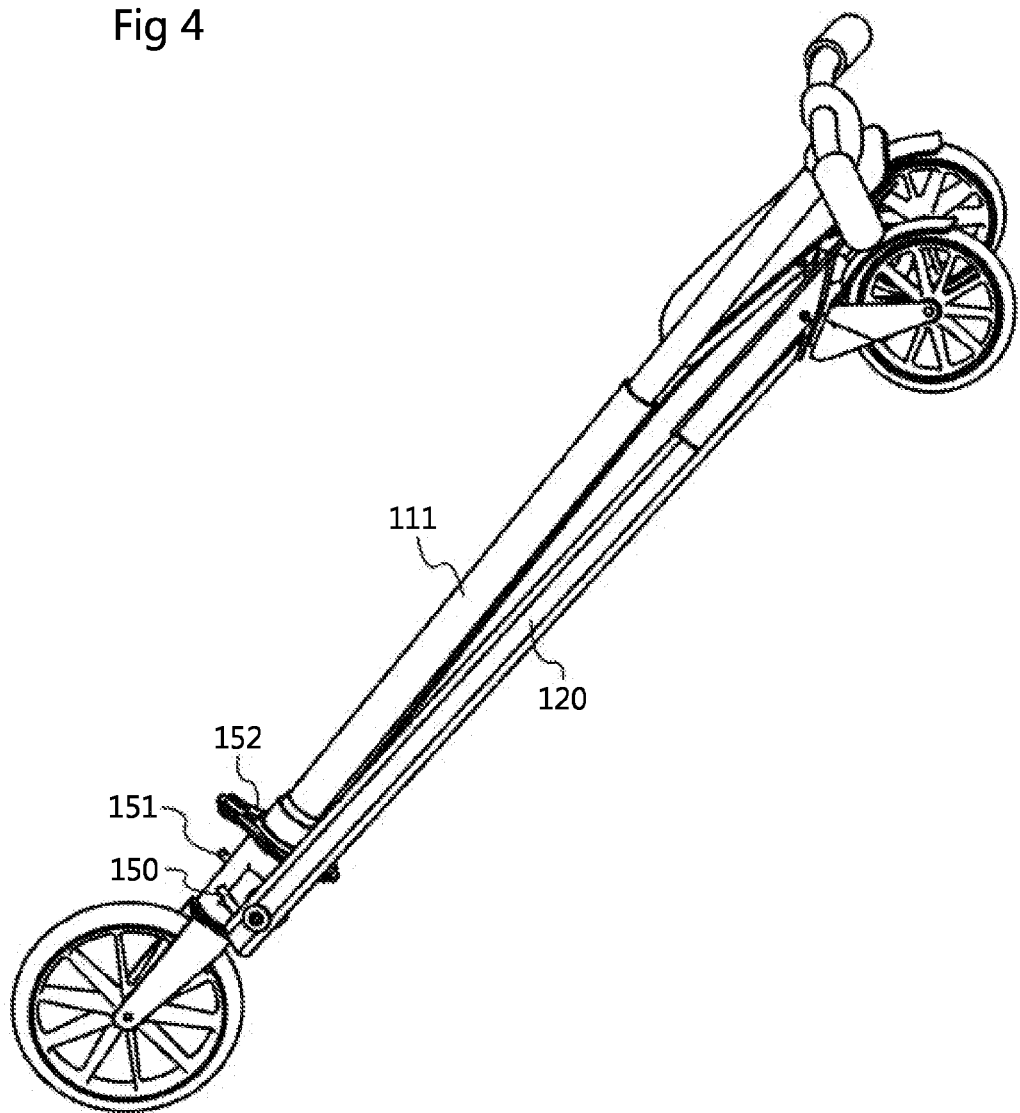
FIG. 4 shows a perspective view of the scooter device of FIG. 1 in a folded position.

FIG. 4 shows a perspective view of the scooter device of FIGS. 1-3 in folded position. When linking piece 152 is disengaged and slid upward clear of linking members 150 and 151, frame arms 120 and 121 are free to move independently of each other and can both be folded upward. The respective angles of the pivoting axes of frame arms 120 and 121 are predetermined such that the distance between the foot pedals is appropriate for the user to stand on when unfolded, and frame arms 120 and 121 are as near as possible to being parallel with shaft 111 when folded. The resultant folded position makes the scooter more compact to facilitate carrying or stowage. If needed, linking piece 152 may be turned to allow frame arms 120 and 121 to be folded closer to shaft 111.

Figure 5:
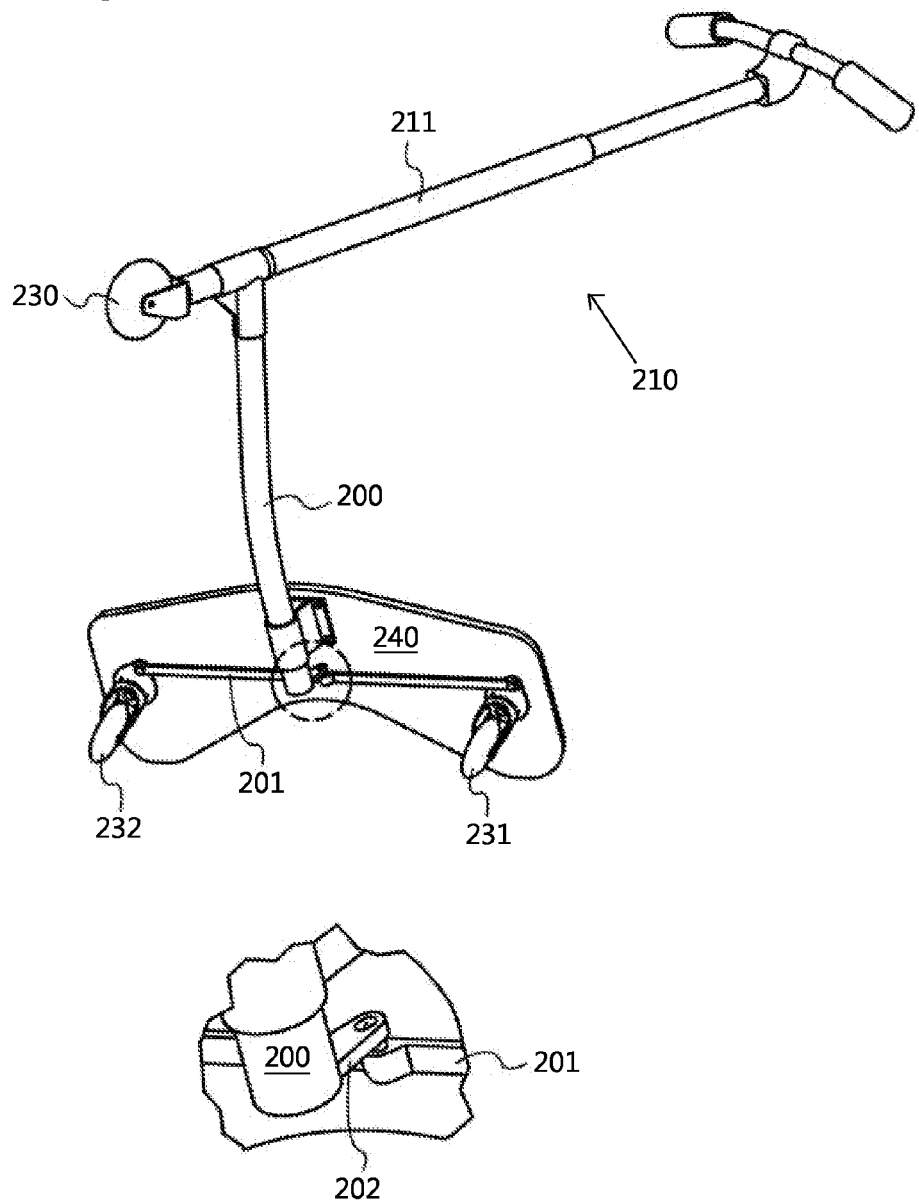
FIG. 5 shows a bottom perspective view of another embodiment of a scooter device in accordance with the present invention. Detail B shows the area of connection between the foot platform and the frame bar.
Figure 6:
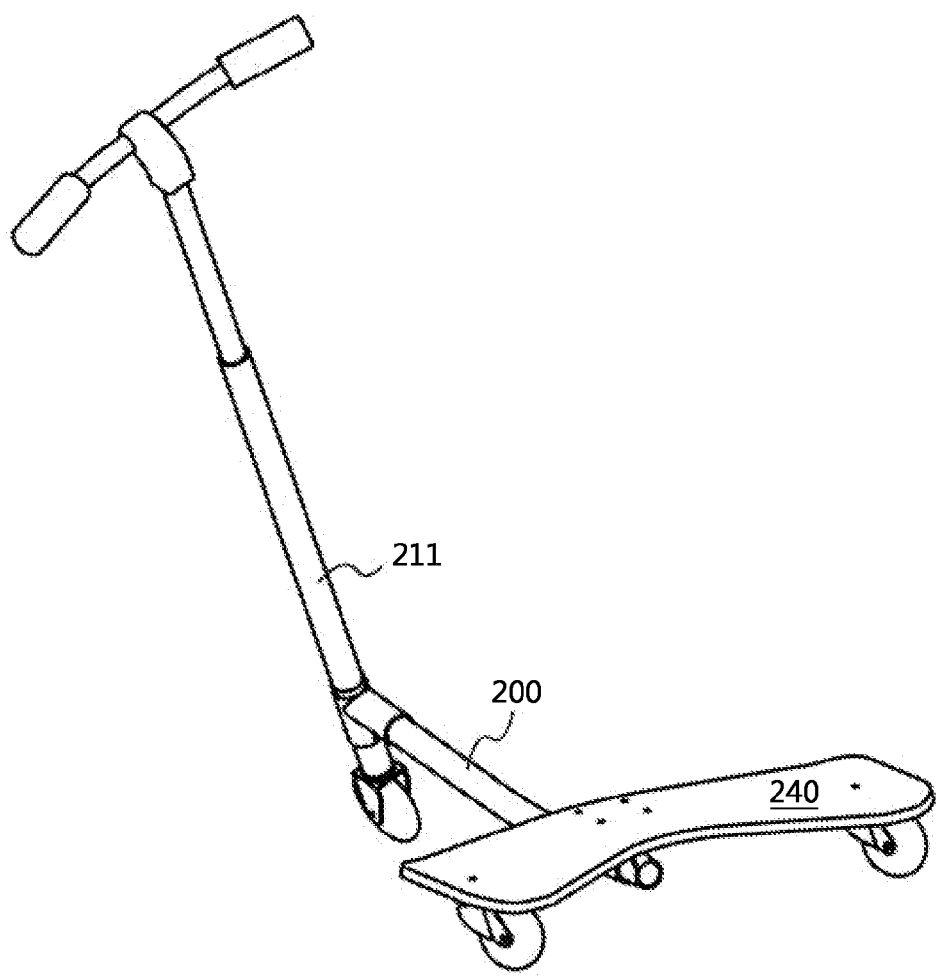
FIG. 6 shows a rear perspective view of the scooter device of FIG. 5, wherein the scooter is leaning to the left.

Referring to FIG. 5, a perspective view of another embodiment of a scooter device in accordance with the present invention is shown. The scooter comprises a front wheel 230, two rear wheels 231 and 232, a steering mechanism 210 comprising a steering shaft 211 and capable of turning front wheel 230, and a frame bar 200 affixed at one end to steering shaft 211 and twistably coupled at the other end to a foot platform 240. Foot platform 240 may be made of a flexible material. A linking bar 201 connects the two rear wheels and is capable of shifting to the left or right to change the orientation of the rear wheels. A linking bar engaging member 202, extending upward from the end of frame bar 200, couples frame bar 200 to approximately the middle of linking bar 201. FIG. 6 shows the scooter device of FIG. 5 leaning to the left. When steering shaft 211 is tilted to the left, linking bar engaging member 202 rotates to pull linking bar 201 to the left, resulting in a change in the orientation of the wheels such that their direction of travel takes on a leftward component. An analogous mechanism of action occurs when steering shaft 211 is tilted to the right.

Figure 7:
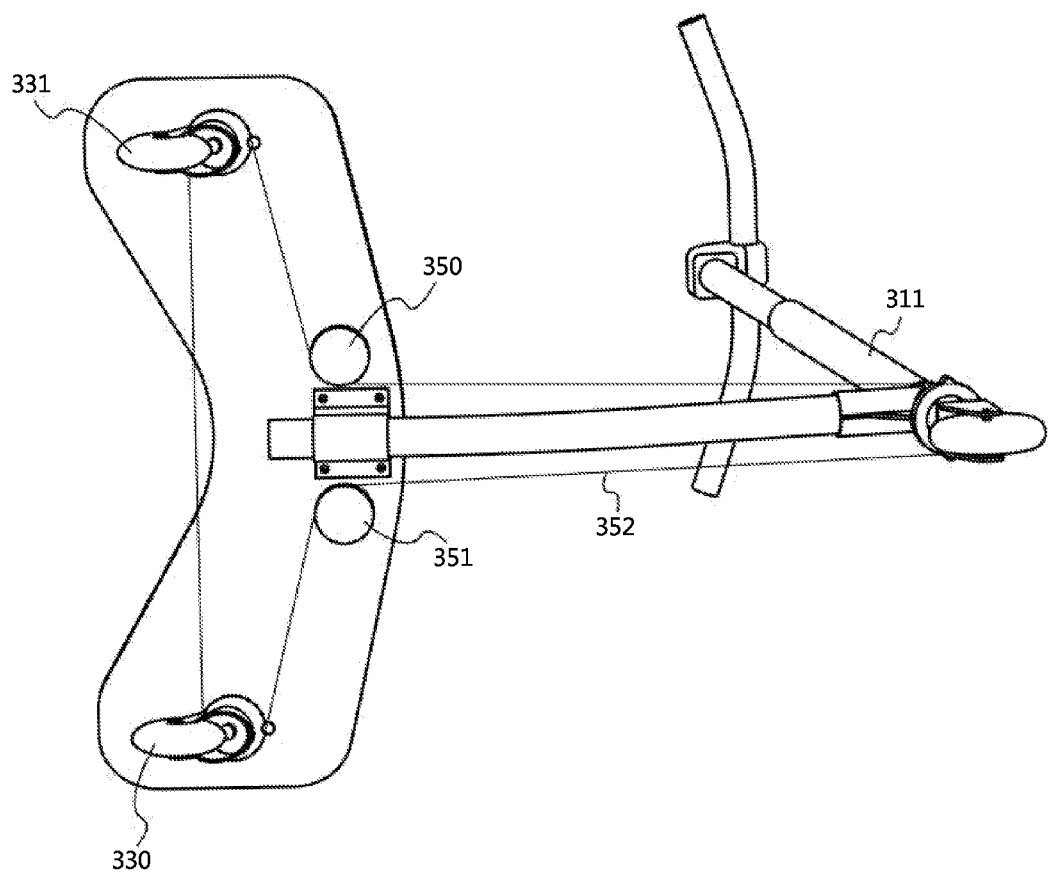
FIG. 7 shows a bottom perspective view of another embodiment of a scooter device in accordance with the present invention.

FIG. 7 shows another embodiment of a scooter device in accordance with the present invention, including a means of associating the steering mechanism with the rear wheels different from that of FIGS. 5 and 6. This is accomplished by means of cables and pulleys rather than by the rigid linking components of the embodiment of FIG. 5. A series of cables 352 connects steering shaft 311 to left wheel 330 via pulley 350; steering shaft 311 to right wheel 331 via pulley 351; and left and right wheels 330 and 331 to each other. Turning of shaft 311 is thereby linked to turning of wheels 330 and 331 in the same direction.

Figure 8:
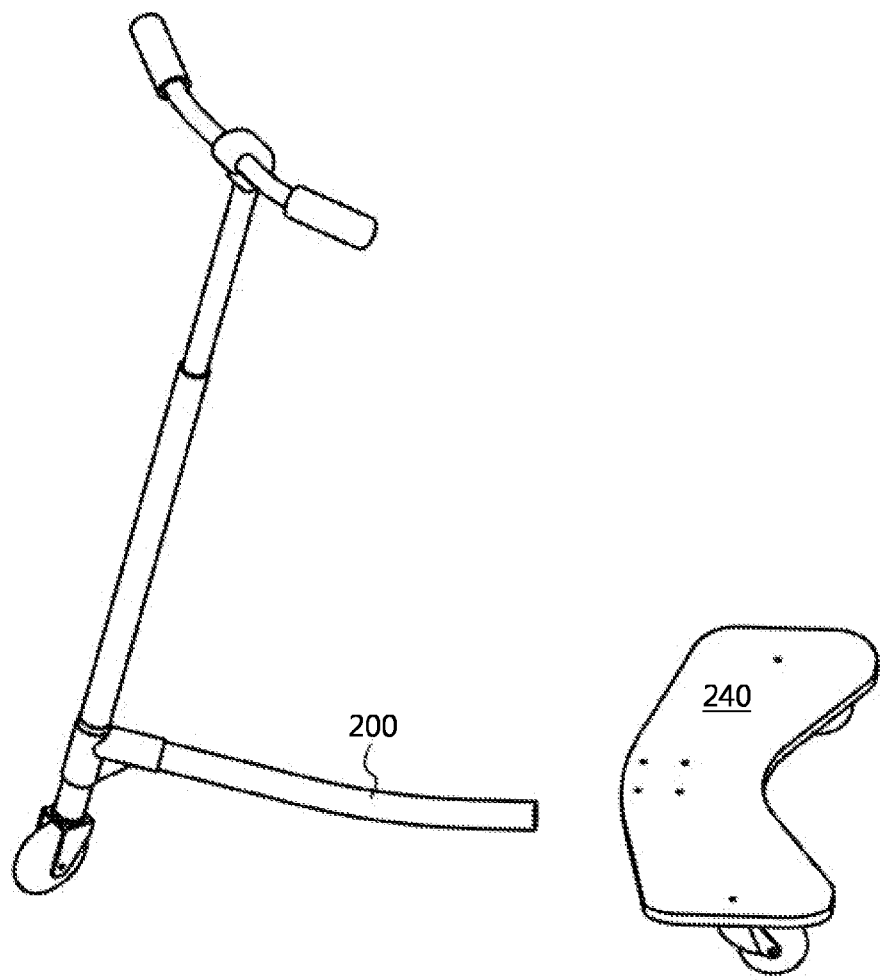
FIG. 8 shows a perspective view of the scooter device of FIG. 5 with the foot platform separated.

The scooter device embodiment shown in FIG. 8 has the single foot platform arrangement of the embodiment of FIGS. 5-7, with the additional feature of detachability of foot platform 240 from frame bar 200. Foot platform 240 may be ridden separately when detached.

Referring to FIG. 9, another embodiment of a scooter device in accordance with the present invention is shown, along with an inset showing a rear wheel in detail. The left and right foot pedals are pivotably mounted on the frame arms such that they may be tilted backward. A braking fender is curved and fitted to the shape of the top of the wheel.

Figure 10:
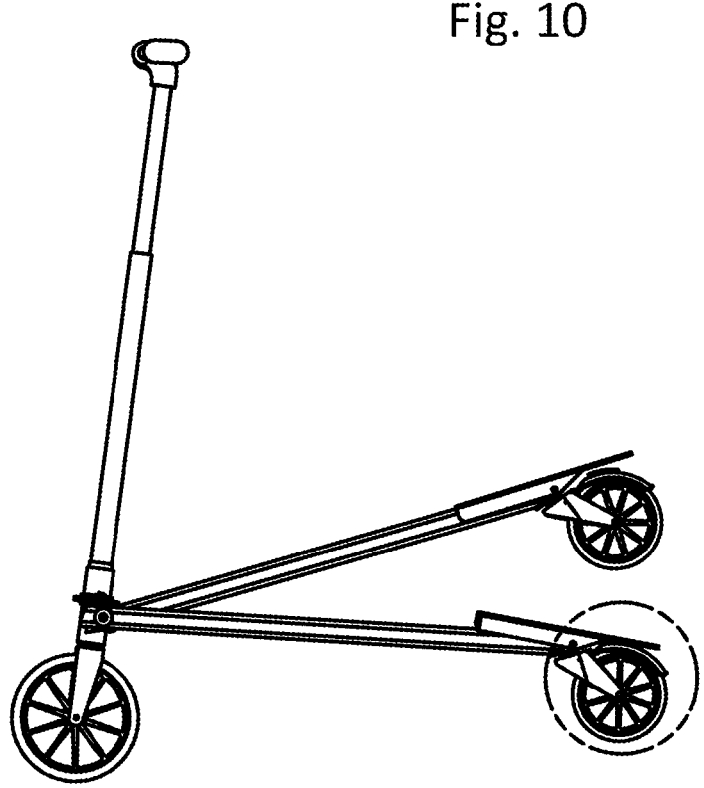
FIG. 10 shows a side view of the scooter device of FIG. 9 during braking, with an inset showing one of the rear wheels with brake engaged.
Figure 10:
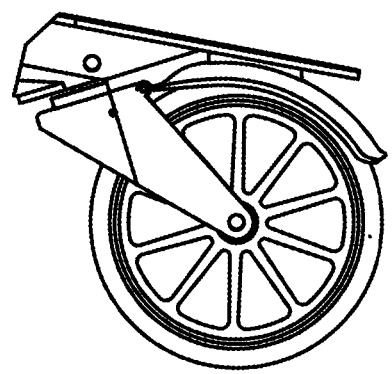

FIG. 10 shows the scooter device of FIG. 9 during braking of the left rear wheel. When tilted backward, the bottom surface of the foot platform comes into contact with the top of the braking fender, on which there may be provided a flat top surface to make contact with the foot platform more stable. The foot platform presses down on the braking fender, which in turn is downwardly displaced and presses against the wheel, resulting in braking. The fitted shape of the braking fender facilitates equal distribution of friction on all parts of the wheel's ground-contacting surface.

The invention claimed is:

1. A human-powered scooter device propelled by side-to-side movement of a user, comprising:
at least one forward located wheel;
at least a first and a second rearward located wheel;
a steering mechanism having a vertically ascending steering control shaft and operably coupled to said forward located wheel such that turning of said steering mechanism achieves turning of said forward located wheel;
a first frame arm extending diagonally rearward from said steering mechanism to said first rearward located wheel, and a second frame arm extending diagonally rearward from said steering mechanism to said second rearward located wheel, the frame arms configured to at least operably support the user riding the scooter device;
wherein each of said first and second frame arms is pivotably coupled to said steering mechanism, with respective pivoting axes of said first and second frame arms being non-parallel to each other and forming a forward-facing angle therebetween of less than 180 degrees; and
further comprising a mechanical plate member that is mounted about the steering control shaft for slidable movement up and down and rotatable movement fore and aft, wherein the mechanical plate member releasably engages with the frame arms in a manner that affects a range of movement of the frame arms when engaged with the frame arms.

2. The scooter device of claim 1, wherein the mechanical plate member releasably engages with the frame arms proximate to where the frame arms are pivotably coupled to the steering mechanism.

3. The scooter device of claim 2, wherein the mechanical plate member has recesses and the frame arms have complementary protrusions, the recesses and complementary protrusions achieving the releasable engagement of the mechanical plate member to the frame arms.

4. The scooter device of claim 1, wherein said rearward located wheels are casters.

5. The scooter device of claim 1, wherein the mechanical plate member, in an in-use orientation, has a maximum width dimension that is greater than a maximum height dimension of the mechanical plate member.

6. The scooter device of claim 1, wherein the mechanical plate member includes a first portion that releasably engages with the first frame arm and a second portion that releasably engages with the second frame arm, and is configured for rotation about the steering control shaft such that the first portion rotates forward and the second portion rotates rearward and vice versa as the mechanical plate member rotates about the steering control shaft.

7. A scooter device propelled by side-to-side movement of a user, comprising:
at least one forward located wheel;
at least a first and a second rearward located wheel, said rearward located wheels being casters;
a steering mechanism having a vertically ascending steering control shaft and operably coupled to the forward located wheel such that turning of the steering mechanism achieves turning of the forward located wheel;
a first support arm extending diagonally rearward from the steering mechanism to the first rearward located wheel, and a second support arm extending diagonally rearward from the steering mechanism to the second rearward located wheel, wherein each of the first and second support arms is pivotably coupled to the steering mechanism and configured to at least operably support the user riding the scooter device; and
a mechanical member mounted about the steering control shaft that releasably engages with the support arms in a manner that affects a range of movement of the support arms, the mechanical member being rotatable about the steering control shaft in a plane that is more horizontal than vertical in an in-use arrangement.

8. The scooter device of claim 7, wherein respective pivoting axes of the first and second support arms are non-parallel to each other and form a forward-facing angle between them of less than 180 degrees.

9. The scooter device of claim 8, wherein when the mechanical member is released from engagement with the support arms, each support arm can pivot to a folded position adjacent the steering mechanism, and the forward-facing angle of less than 180 degrees causing the support arms to approach one another as they are pivoted toward the steering mechanism.

10. The scooter device of claim 7, wherein the mechanical member has a first portion that releasably engages with the first support arm and a second portion that releasably engages with the second support arm and is configured for rotation about the steering control shaft such that the first portion rotates forward and the second portion rotates rearward and vice versa as the mechanical member rotates about the steering control shaft.

11. The scooter device of claim 7, wherein the mechanical member is configured to move along the steering control shaft between a position in which the mechanical member is physically engaged with the support arms and a position in which the mechanical member is physically disengaged from the support arms.

12. The scooter device of claim 7, wherein the mechanical member has recesses and the support arms have complementary protrusions, the recesses and complementary protrusions achieving the releasable engagement of the mechanical member to the support arms.

13. The scooter device of claim 7, further comprising:
two foot pedals respectively disposed above the first and second rearward located wheels, at least one of the two foot pedals being rearwardly tiltable; and
a braking member disposed above the rearward located wheel associated with the tiltable foot pedal, and capable of being displaced downward until it contacts the wheel, the braking member being at least in part curved in shape.

14. A scooter device propelled by side-to-side movement of a user, comprising:
- at least one forward located wheel;
- at least a first and a second rearward located wheel, the rearward located wheels being caster wheels;
- a steering mechanism having a vertically ascending steering control shaft and operably coupled to the forward located wheel such that turning of the steering mechanism achieves turning of the forward located wheel;
- a first support arm extending diagonally rearward from the steering mechanism to the first rearward located wheel, and a second support arm extending diagonally rearward from the steering mechanism to the second rearward located wheel, wherein each of the first and second support arms is pivotably coupled to the steering mechanism and configured to at least operably support the user riding the scooter device; and
- a mechanical plate member mounted about the steering control shaft that releasably engages with the support arms in a manner that affects a range of movement of the support arms, wherein the mechanical plate member moves along the steering control shaft between a position in which the mechanical plate member is physically engaged with the support arms and a position in which the mechanical plate member is physically disengaged from the support arms.

15. The scooter device of claim 14, wherein the mechanical plate member is configured for rotatable movement about the steering control shaft in a plane that is more horizontal than vertical in an in-use arrangement.

16. The scooter device of claim 15, wherein the mechanical plate member has a first portion that releasably engages with the first support arm and a second portion that releasably engages with the second support arm and is configured for rotation about the steering control shaft such that the first portion rotates forward and the second portion rotates rearward and vice versa as the mechanical plate member rotates about the steering control shaft.

17. The scooter device of claim 15, wherein the mechanical plate member has recesses and the support arms have complementary protrusions, the recesses and complementary protrusions achieving the releasable engagement of the mechanical plate member to the support arms.

18. The scooter device of claim 14, wherein respective pivoting axes of the first and second support arms are non-parallel to each other and form a forward-facing angle between them of less than 180 degrees.

* * * * *